United States Patent [19]

Roth

[11] 4,098,095
[45] Jul. 4, 1978

[54] REFRIGERATION APPARATUS FOR VISCOUS PASTE SUBSTANCE

[76] Inventor: Eldon N. Roth, 1025 Tennessee St., San Francisco, Calif. 94107

[21] Appl. No.: 688,599

[22] Filed: May 21, 1976

[51] Int. Cl.$^2$ ............................................. A23P 1/00
[52] U.S. Cl. ..................................... 62/346; 165/94; 264/175; 425/223; 425/363; 426/524
[58] Field of Search ................... 62/346, 354; 165/91, 165/94; 426/502, 524; 425/324, 363, 223, 224; 72/106; 264/175, 280

[56] References Cited

U.S. PATENT DOCUMENTS

| | | | |
|---|---|---|---|
| 1,583,484 | 5/1926 | Morrison et al. | 165/91 X |
| 2,007,837 | 7/1935 | Rudd et al. | 62/346 X |
| 2,140,788 | 12/1938 | Cowgill | 425/223 X |
| 3,405,209 | 10/1968 | Aagaard et al. | 62/346 X |
| 3,478,439 | 11/1969 | Hyldon | 165/91 X |
| 3,499,957 | 3/1970 | Ancker | 264/175 |
| 3,891,376 | 6/1975 | Gersbeck et al. | 425/224 X |
| 3,938,927 | 2/1976 | Brinkman et al. | 425/224 X |
| 3,947,168 | 3/1976 | Ujihara et al. | 425/223 X |
| 3,956,517 | 5/1976 | Curry et al. | 426/502 |

Primary Examiner—William E. Wayner
Assistant Examiner—William E. Tapolcai, Jr.
Attorney, Agent, or Firm—Fitch, Even, Tabin & Luedeka

[57] ABSTRACT

Refrigeration apparatus for quickly reducing the temperature of and for solidifying a viscous paste substance of the type that is produced as a byproduct in animal slaughtering. Because the material is high in proteins, it has substantial commercial value. The apparatus includes a relatively large cylindrical drum the surface of which is cooled by circulating a refrigerant through the interior of the drum. The drum is continuously rotatively driven and there is an inlet roll and a nozzle for introducing the relatively warm viscous paste in the nip between the drum surface and the roll. Downstream of the inlet is one or more compression rolls which flatten the paste material further. Spaced circumferentially from the inlet is an outlet that includes a scraper blade and a hold down roller immediately upstream of the scraper blade so that after the material traverses the apparatus, it is refrigerated, relatively stiff and ready for further processing and shipment.

10 Claims, 6 Drawing Figures

REFRIGERATION APPARATUS FOR VISCOUS PASTE SUBSTANCE

BACKGROUND OF THE INVENTION

1. Field of the Invention

This invention relates to refrigeration apparatus and, more particularly, to continuously running refrigeration apparatus which cools and hardens a pastelike substance so as to preserve the material and facilitate further treatment and shipment.

2. Description of the Prior Art

U.S. Pat. No. 788,446 discloses a refrigerated drum onto which material is introduced by a spray.

U.S. Pat. No. 888,680 discloses a drum cooler onto which lard is delivered by the force of gravity from a strainer trough.

U.S. Pat. No. 1,823,725 discloses an ice making machine having a cylindrical drum onto which water is sprayed from a pipe extending parallel to the axis of rotation of the drum.

U.S. Pat. No. 3,245,801 discloses a cooling drum for fatty compositions wherein the drum is confined within a concentric refrigerated chamber. The material to be cooled is pumped into the chamber, acted on by the drum and pumped out of the chamber.

U.S. Pat. No. 3,774,409 discloses a deep freezing apparatus wherein a semi-fluid food product is transported over a refrigerated drum between two endless belts formed of stainless steel. To discharge the frozen material, the belts are separated after traversing the drum.

SUMMARY OF THE INVENTION

The present invention finds utility in the recovery from animal fat and like undesirable animal products protein material that has significant food value. Fat is separated from the protein material by heating a mixture of the constituents to melt the fat, and the residue, which contains the protein material, must be cooled quickly to prevent deterioration: certain government regulations require that the protein product be reduced below 40° F. within one-half hour of its separation from fat. To achieve optimum inhibition of bacteria growth, the product should be lowered to a temperature of from 0° to 10° F.

The protein material has a viscous pastelike consistency even when at the elevated temperature in consequence of which it is not freely flowable. Accordingly, it is an object of the present invention to provide a cooling drum apparatus equipped to afford distribution of the viscous paste material thereon. This object is achieved according to the present invention by providing adjacent to the drum a roller of relatively small diameter which defines in cooperation with the drum a nip; the viscous material is introduced into the nip and because of the fixed spacing between the roll and the drum, the viscous paste is applied to the drum as it rotates in a smooth layer of substantially uniform thickness.

Another object is to produce a refrigerated product of uniform physical characteristics. This object is achieved by providing additional rolls downstream of the roll mentioned above which compress the pastelike material against the drum surface so as to compress and compact it.

A feature and advantage of the compression rollers mentioned next above is that the viscous paste is continuously urged into intimate, heat exchanging relationship with the surface of the drum.

A further object of the invention is to provide a refrigerating apparatus that produces a substantially continuous uniform sheet of protein material which can be chopped or otherwise comminuted into uniform shaped pieces for introduction into commerce. This object is achieved by providing adjacent the drum a scraper blade immediately upstream of which is a roll supported for rotation adjacent the drum surface. The blade is supported at a small acute angle with respect to tangency at its point of cooperation with the drum surface so that the paste material is removed from the drum in a continuous sheet in response to rotation of the drum.

The foregoing together with other objects, features and advantages will be more apparent after referring to the following specification and the accompanying drawings.

DESCRIPTION OF THE PREFERRED EMBODIMENTS

Figure 1:
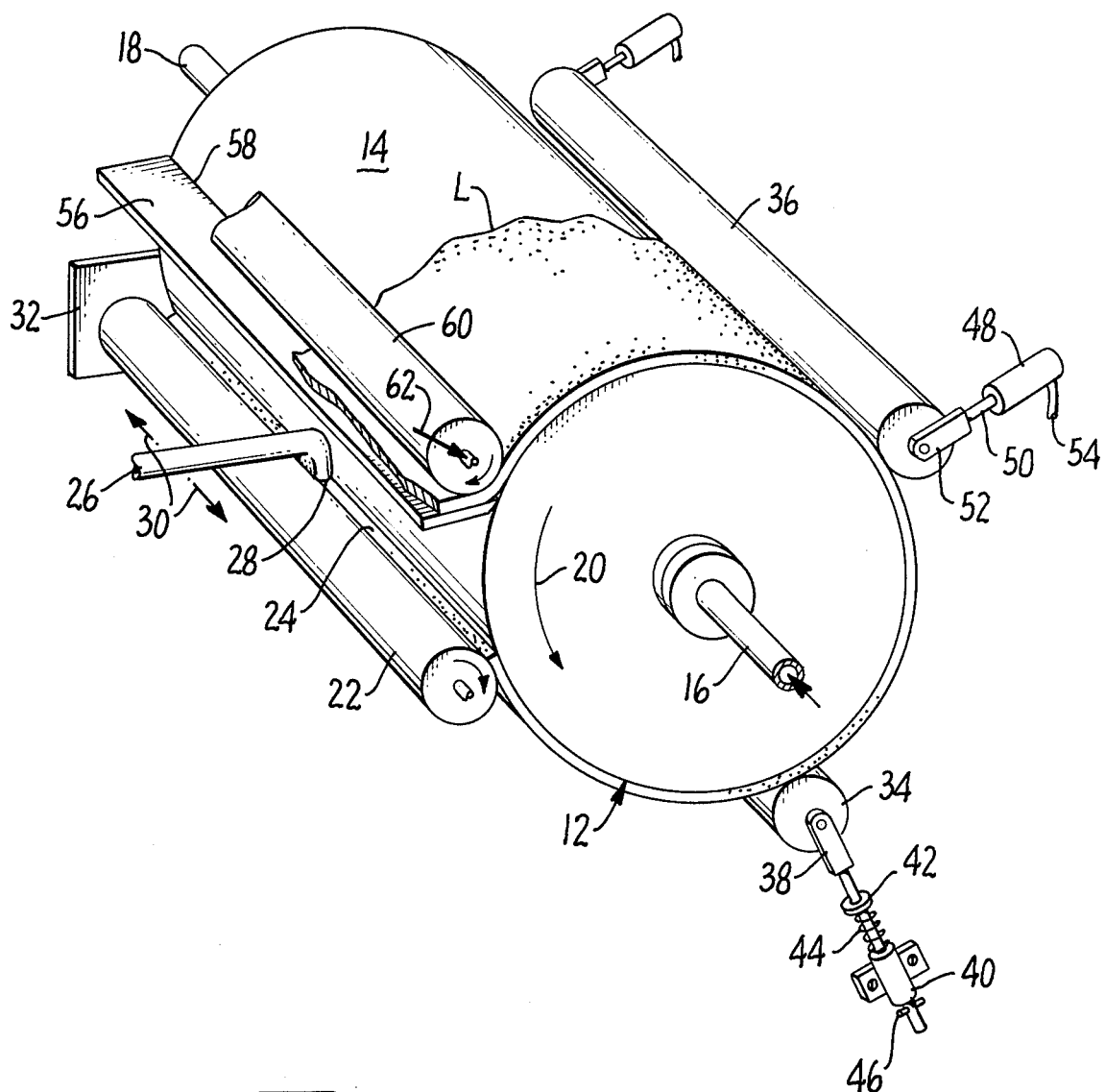
FIG. 1 is a perspective view of one embodiment of the invention.

Referring more particularly to the drawings, reference numeral 12 indicates a drum defining a cylindric surface 14 which is preferably formed of stainless steel or the like so as to be smooth and heat conductive. The interior of drum 12 is hollow, or circuited, and fluid communication is established therewith by an inlet pipe 16 and an outlet pipe 18. A refrigerant such as freon or ammonia is introduced into inlet 16 and vented through outlet 18 so that surface 14 is maintained at a reduced temperature by circulation of the refrigerant. Inlet pipe 16 and outlet pipe 18 are located coaxially or centrally of cylindric surface 14 and serve as an axle on which drum 12 is supported for rotation. Drive means (not shown in FIG. 1) are provided for rotating drum 12 in a direction indicated by arrow 20. A roll 22 is supported for rotation on an axis parallel to the central axis of drum 12 at a location intermediate the vertical extremities of the downward moving side of surface 14. Roll 22 is so supported that there is a space or nip 24 between the surface of the roll and cylindric surface 14. It is preferred that the support for roll 22 is adjustable so as to afford adjustability of space 24 to accommodate different operating conditions and different conditions of the raw material supplied to the refrigeration apparatus.

For introducing the viscous paste into nip 24 there is an inlet pipe 26 that terminates in a nozzle 28 in alignment above nip 24. Nozzle 28 is supported by means (not shown) to afford transverse reciprocation as indicated by double arrow 30 so as to distribute the viscous paste substance uniformly along the nip. To confine the material within nip 24 there are end plates, one of which is seen at 32 and which prevent the material from escaping from the nip.

Circumferentially spaced along the periphery of drum 12 is one or more compression rolls, there being two such rolls 34 and 36 in the embodiment shown in FIG. 1. The rolls function to compress the paste material into more intimate contact with the refrigerated cylindrical surface 14 and to smooth the outer surface of the paste product during its traverse of the apparatus. In order to effect performance of these functions, compression rolls 34 and 36 are resiliently urged radially inward of drum 12 so that they can accommodate variations in the thickness of the paste. Among the mechanisms for so supporting the compression rolls is that exemplified in FIG. 1 in association with roll 34. The roll is journaled at the extremity of a rod 38 that is supported for slidable axial movement in a sleeve 40 which is fixed to the frame of the machine. Rigid with rod 38 is a collar 42; intermediate collar 42 and sleeve 40 is a compression spring 44 which biases roll 34 radially inward of drum 12. A cross pin 46 in the portion of rod 38 outward of sleeve 40 limits the inward movement of roll 34 so as to avoid contact between the roll and cylindric surface 14 in the absence of paste thereon.

Another suitable mechanism for supporting the compression rolls for resilient movement is exemplified in association with roll 36 by an air cylinder 48 which has a piston rod 50. Rigid with the free end of piston rod 50 is a journal block 52 in which roll 36 is supported for rotation. Interior of air cylinder 48 is a stop equivalent to cross pin 46 to limit the inward movement of roll 36. The magnitude of air pressure supplied to cylinder 48 through a tube 54 determines the amount of force applied to the paste as it traverses the space between roll 36 and cylindrical surface 14.

Spaced around the circumference of drum 12 as close to inlet roll 22 as practicable is a scraper blade 56 having an edge 58 contacting cylindrical surface 14 to scrape the paste layer from the surface therefrom. Immediately upstream of scraper blade 56 is a third compression roll 60 which is resiliently biased toward surface 14 in a direction indicated by arrow 62 by any suitable mechanism such as that described in connection with roll 34 or roll 36. Compression roll 60 holds down the paste layer on cylindrical surface 14 upstream thereof notwithstanding the deflection of the material downstream thereof by blade 56 so that the material can be removed from the drum without adversely affecting that portion of the paste material still in contact with the drum.

The apparatus of FIG. 1 operates as follows: refrigerant is supplied through inlet pipe 16 to the interior of drum 12 so as to reduce the temperature of cylindrical surface 14 to a temperature at or below 40° F., for example. Additionally, rolls 22, 34, 36, 60 can be of hollow construction and can be refrigerated in the same manner. Thereafter, the relatively warm viscous paste substance is introduced through pipe 26 and nozzle 28 into nip 24. Because of the transverse reciprocation of the inlet pipe along the path indicated by double arrow 30, the material is uniformly distributed throughout the length of the nip and is there confined by end plate 32 and a similar plate (not shown) on the opposite end of the nip. Rotation of drum 12 and roll 22 causes extrusion onto cylindrical surface 14 of a layer L of viscous paste substance having a thickness substantially equal to the space between the surface of the roll and the cylindrical surface. Because of the consistency of the paste and the low temperature of cylindrical surface 14, the material adheres to the surface. Continued rotation of drum 12 transports the paste past compression rolls 34 and 36 where the paste layer is further compressed and the exterior surface of the paste layer is smoothed and the inner surface is caused to make more intimate contact with surface 14. Further compression results because of the springy nature of the fibrous product. After each compression step, the product tends to spring back somewhat. As refrigeration progresses, the extent of "spring back" decreases. Further advancement of the paste layer in response to rotation of drum 12 brings the layer beneath roll 60 to scraper blade 56 at which the layer is deflected outward along the surface of the blade. The then cooled sheet of the material is delivered to further processing equipment, such as a chopper or the like, for chopping the protein material into small pieces of uniform size for packaging and shipment.

In one system designed according to the invention, roll 12 is driven at a rate of about ½ rpm, a speed which affords sufficient residence time between the material and surface 14 to extract the heat from the viscous substance. Moreover, such speed is sufficiently slow to avoid significant centrifugal force that would tend to separate the viscous substance from surface 14. A preferred operating temperature range for the drum has been found to be from +10° F. to −60° F. At this temperature range, the inner surface of the product immediately freezes and adheres to the drum. With a product layer of 1/16 inch to ½ inch in thickness, freezing of the entire layer is achieved in from 1 to 7 minutes. This flash freezing immediately inhibits bacteria growth and results in the formation of small ice crystals within the product. Such crystalline formation is preferred, as it minimizes color loss during the freezing process.

Figure 2:
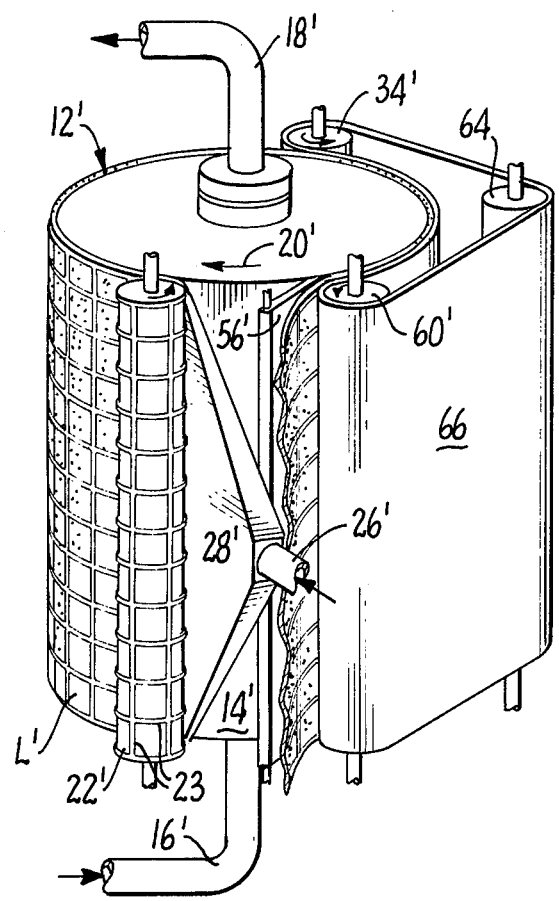
FIG. 2 is a perspective view of another embodiment of the invention.
Figure 3:
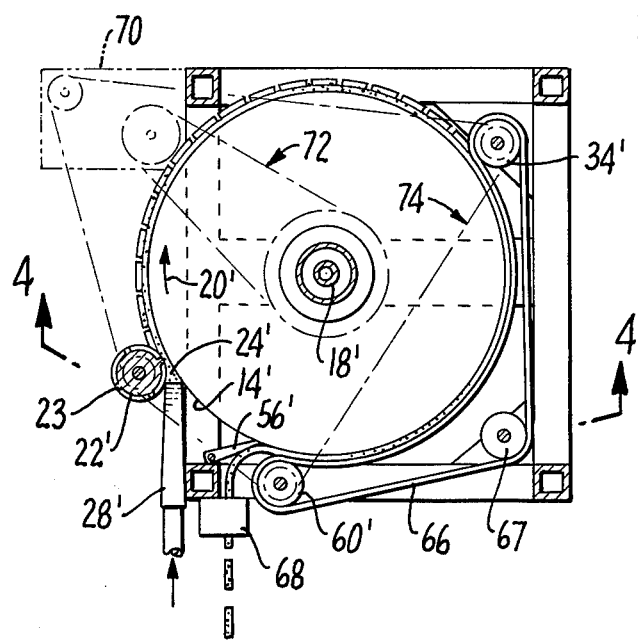
FIG. 3 is a top view of the apparatus shown in FIG. 2.
Figure 4:
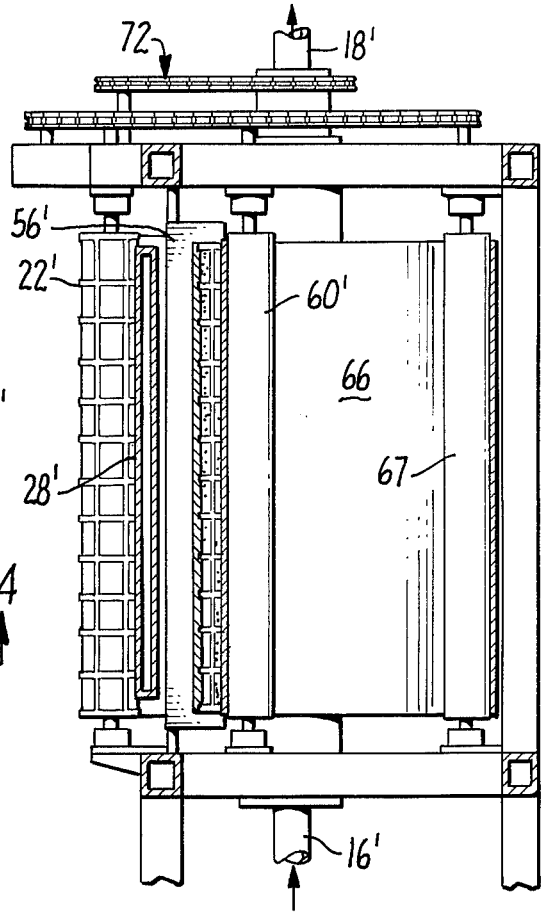
FIG. 4 is a cross-sectional view taken along the planes designated by line 4—4 of FIG. 3.

The construction of the embodiment depicted in FIGS. 2–4 is substantially similar to that described hereinabove, except that the drum in the embodiment of FIGS. 2–4 is supported for rotation on a vertical axis. Because of the substantial similarity, similar characters of reference, with the addition of a prime, will be employed where appropriate.

In the embodiment of FIGS. 2–4, there is a drum 12' having a cylindrical surface 14', the interior of which is hollow, or circuited, and through which refrigerant is circulated by an inlet pipe 16' and an outlet pipe 18–. The inlet and outlet pipes serve as the axle for supporting drum 12' for rotation about the central cylindric axis thereof in a direction indicated by arrow 20'. There is an inlet roll 22' on the surface of which, in a substantially square pattern, is a plurality of longitudinal and circumferentially oriented ribs 23. Because ribs 23 project from the main surface of roll', the paste material deposited onto surface 14' has a corresponding pattern of depressions or thin regions. These thin regions, because they have less material and therefore less heat energy, are rapidly cooled and solidified, and serve to retain the paste layer onto the drum against the force of gravity. The resultant "waffle-like" product is also ideally suited for ease of removal and breakage into pieces of uniform size. Roll 22' is supported so that the surface thereof is spaced from cylindrical surface 14' to form a nip 24'. The paste substance is introduced into nip 24' through an inlet pipe 26' which terminates in a fan-shaped nozzle 28' which distributes the material throughout the axial extent of nip 24'.

Downstream of roll 22' are compression rolls 34' and 60' which in conjunction with a tension roll 64 support a flexible endless belt 66. Rolls 34' and 60' are supported by mechanisms that afford resilient biasing of the rolls toward cylindric surface 14'. These mechanisms may be of the type described hereinabove in connection with FIG. 1. Roll 64 is arranged to tension belt 66 in a taut condition and one or more of rolls 34', 60' and 64 can be driven. Endless belt 66 can be formed of stainless steel or like flexible material and, in combination with the location of rolls 34' and 60' in circumferentially spaced relation and the tension of the belt, forms a compression zone throughout which the paste material is compressed against cylindric surface 14' as it traverses the apparatus.

Immediately downstream of the nip between the portion of endless belt 66 that contacts roll 60' and the drum surface, there is a scraper blade 56' which separates the cooled solidified paste material from the surface of roll 14' for further processing. With reference to FIG. 3, such further processing can include transporting the paste material through a chopper 68, which cuts the frozen paste material into small pieces suitable for still further processing or shipment.

Although the system for driving drum 12' and conveyer 66 do not, per se, constitute a novel portion of the invention, a description of the drive mechanism serves to afford a clearer understanding of the operation of the apparatus. Referring to FIG. 3 there is a gear box 70 having a power input from a motor (not shown) or the like. There is an output sprocket forming part of a chain and sprocket drive train 72 which supplied rotative power to drum 12'. Gear box 70 has a second sprocket which drives a sprocket and chain drive train 74 which rotatively drives rolls 22', 34' and 60'. The gear box is arranged so that the peripheral speed of the rolls and the peripheral speed of the drum is the same in order that the paste layer is transported smoothly through the apparatus and dislodged from drum 14' only at blade 56'. In certain instances drive train 74 can be dispensed with or can be operatively connected only to roller 22' since in many situations the paste material is sufficiently stiff when it reaches roll 34' that it will drive endless belt 66 from frictional forces between the paste material and the endless belt.

The operation of the embodiment of FIGS. 2–4 can be clearly appreciated by reference to FIG. 2 wherein refrigerant is introduced to the interior of drum 12' through 16' until the drum surface temperature is lowered after which the drum is rotatively driven in the direction of arrow 20' and the relatively warm viscous material is supplied through inlet pipe 26'. After the paste material traverses nozzle 28' it is distributed uniformly into the nip formed between roll 22' and cylindrical drum surface 14'. The rate of delivery of paste material through pipe 26' is synchronized with the rotative speed of the drum so that a smooth layer of paste L' is placed on the cylindrical surface. Because of ribs 23, the layer has a grid of portions of reduced thickness which cool relatively quickly and serve to retain the balance of the paste layer 1" on the surface. As the drum rotates, the paste material is refrigerated as it advances to a position opposite roll 34'. Continued rotation brings layer L' beneath belt 66, where it is further compressed to smooth the outer surface and to urge the layer of material into intimate heat exchanging contact with the dylindrical surface of drum 12'. When the layer passes blade 56', it is moved outward of the roll, a procedure which does not disrupt contact between the layer and surface 14' upstream of roll 60'. The material so removed from the drum is chopped by chopper 68 and packaged for transportation or otherwise further processed. The operation of the apparatus of FIGS. 2–4 is thus seen to be similar to the operation of the embodiment of FIG. 1 described hereinabove.

Figure 5:
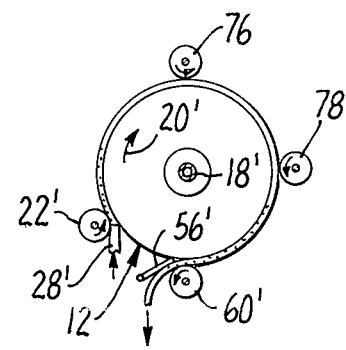
FIG. 5 is a schematic top view showing a modification to the apparatus of FIG. 2.

Certain modifications of the apparatus of FIG. 2 can be effected without materially altering the effectiveness of the apparatus. With reference to FIG. 5, endless belt 66 is dispensed with in favor of compression rolls 76 and 78 which function substantially identically to rolls 34 and 36, described in more detail hereinabove in connection with FIG. 1. The decision in a given environment whether the arrangement of FIG. 2 or the arrangement of FIG. 5 should be employed depends on various operating conditions such as the average consistency of the paste material, the ambient operating temperatures, and the efficiency of the refrigeration system available to supply refrigerant to the interior of the drum.

Figure 6:
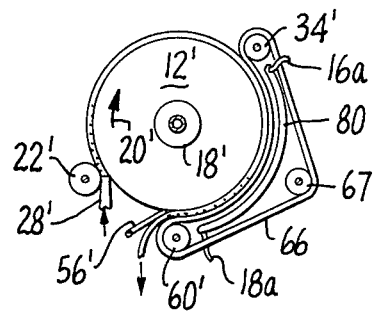
FIG. 6 is a schematic top view showing another modification of the apparatus of FIG. 2.

Another modification of the invention is shown in FIG. 6. Such modification employs a hollow plenum 80 which is supplied with refrigerant so that its inner or convex surface will be at a low temperature. The plenum has an inlet pipe 16a and an outlet pipe 18a for affording circulation of a refrigerant therethrough. The plenum is axially coextensive with drum 12' and with endless conveyer 66 and means (not shown) are provided for urging the convex surface into contact with the surface of conveyor 66 that is opposite from the surface contacting the paste layer L' on drum 14'. The inner or convex surface of plenum 80 has a radius of curvature corresponding to that of cylindric surface 14'. Because of the extra heat exchange capabilities afforded by plenum 80, it is in some cases possible to operate the modification shown in FIG. 6 at a somewhat higher rotative speed so as to increase the rate at which the paste material is conveyed through the apparatus.

Thus it will be seen that the invention provides an apparatus which produces a uniform product, which is relatively simple and maintenance free, which is efficient, and which is capable of continuous operation for rapidly reducing the temperature of viscous protein substances to the end that these valuable products can be recovered in an efficient, inexpensive and sanitary fashion. Although several embodiments have been shown and described, it will be obvious that other adaptations and modifications can be made without departing from the true spirit and scope of the invention.

What is claimed is:

1. Apparatus for rapidly reducing the temperature of a viscous paste substance, said apparatus comprising: a drum having a cylindric exterior wall formed of heat conductive material, means for refrigerating said wall; means for rotatively driving said drum about the central cylindric axis thereof; a cylindric roll having a diameter substantially less than the diameter of the drum; means for rotatively supporting the roll for rotation on an axis parallel to the cylindric axis of said drum; said roll being spaced from said cylindric wall so as to form a nip between said roll and said cylindric wall; a tube terminating adjacent said nip for supplying the viscous paste substance to said nip, said tube being mounted for reciprocating movement relative to said nip to effect uniform distribution of the viscous paste substance therein; means downstream to said cylindric roll for compressing the viscous paste substance against the drum surface and uniformly distributing the viscous paste substance thereon; and means spaced circumferentially from said compressing means for removing cooled viscous paste from said drum surface.

2. Apparatus for rapidly reducing the temperature of a viscous paste substance, said apparatus comprising: a drum having a cylindric exterior wall formed of heat conductive material, means for refrigerating said wall; means for rotatively driving said drum about the central cylindric axis thereof, means for introducing the viscous paste substance onto the surface of said drum along a line substantially parallel to said axis; at least one roller circumferentially spaced along said drum from said introducing means; means for resiliently biasing said roller toward said cylindric wall so as to compress the viscous paste substance against the cylindric wall and smooth the exterior surface of the viscous paste substance on said cylindric wall; and, means spaced circumferentially from said roller for removing cooled viscous paste from said drum surface.

3. Apparatus according to claim 2 wherein said means for introducing the viscous paste substance onto the surface of said drum comprises an additional roller means for subjecting said substance to a first stage of compression as it is introduced, said one circumferentially spaced roller thereafter subjecting said substance to a second stage of compression so that said first and second stages of compression function to progressively compress the substance and increase its thermal conductivity.

4. Apparatus according to claim 3 wherein said drum is hollow and wherein said refrigerating means includes an inlet pipe at one axial end of the drum and an outlet pipe at the other end of the axial end of the drum, said inlet and outlet pipes being disposed centrally of the drum so as to be substantially coextensive with the axis of said cylindric wall, said pipes forming an axle for rotatively supporting the drum and for affording circulation through the hollow interior thereof of a refrigerant.

5. Apparatus according to claim 3 wherein said removing means includes a blade having an edge contacting the drum surface and a hold down roll upstream of and adjacent to said blade, said hold down roll being supported for rotation about an axis parallel to said drum axis and engaging the viscous paste substance immediately upstream of said blade.

6. Apparatus according to claim 2 wherein said introducing means includes a cylindric roll having a diameter substantially less than the diameter of the drum, means for rotatively supporting the roll for rotation on an axis parallel to the cylindric axis of said drum, said roll being spaced from said cylindric wall so as to form a nip between said roll and said cylindric wall, and means for supplying the viscous paste substance uniformly along said nip.

7. Apparatus according to claim 6 wherein said supplying means includes a pipe for conveying the viscous past substance and a diverging fan-shaped nozzle secured to said pipe and having a long narrow opening adjacent said nip and substantially axially coextensive therewith.

8. Apparatus according to claim 6 wherein said roll has formed on the exterior surface thereof a plurality of radially projecting ribs, said ribs forming corresponding portions of reduced thickness on the paste layer on said drum.

9. Apparatus according to claim 2 wherein said compressing means includes a first roll circumferentially spaced along said cylindrical drum wall from said introducing means and a second roll circumferentially spaced along said drum wall from said first roll, an endless belt trained around said first and second rolls and having a portion extending between said rolls and adjacent said cylindric drum surface, and means for tensioning said belt to urge said portion radially inward of said cylindric drum surface to compress the viscous paste substance thereon.

10. Apparatus according to claim 9 in conjunction with an arcuate plenum disposed for contact with the outer surface of said portion of said endless belt, said plenum having a radius of curvature corresponding to the radius of curvature of said cylindric wall so as to afford a substantial area of contact between said plenum and said endless belt, and means for refrigerating said plenum so as to enhance removal of heat energy from said viscous paste substance traversing said endless belt.

* * * * *